350-376 SR

XR 3,512,866

May 19, 1970 H. W. GRIFFITHS ET AL 3,512,866

MAGNETO-OPTICAL HAND VIEWER

Filed Dec. 3, 1965 2 Sheets-Sheet 1

INVENTORS
Henry W. Griffiths
Alfred M. Nelson
Arthur W. Evansen
Alfred E. Gray

By Smyth, Roston & Pavitt
Attorneys

May 19, 1970 H. W. GRIFFITHS ET AL 3,512,866

MAGNETO-OPTICAL HAND VIEWER

Filed Dec. 3, 1965 2 Sheets-Sheet 2

INVENTORS:
Henry W. Griffiths
Alfred M. Nelson
Arthur W. Evansen
Alfred E. Gray

By Smyth, Roston & Pavitt
Attorneys

United States Patent Office 3,512,866
Patented May 19, 1970

3,512,866
MAGNETO-OPTICAL HAND VIEWER

Henry W. Griffiths, Torrance, Alfred M. Nelson, Redondo Beach, Arthur W. Evansen, Torrance, and Alfred E. Gray, Culver City, Calif., assignors to The Magnavox Company, Torrance, Calif., a corporation of Delaware Filed Dec. 3, 1965, Ser. No. 511,468
Int. Cl. G02f *1/18;* G11b *11/10*
U.S. Cl. 350—151 20 Claims

ABSTRACT OF THE DISCLOSURE

This invention relates to a system which provides a visual representation of the magnetic states in a magnetic medium. The system includes a light source, a polarizer, particular optical means and a thin magnetic film adjacent to the medium for rotating the polarized light from the source in accordance with the magnetic states induced in the thin film from the medium. A biasing coil is disposed in adjacent relationship to the magnetic medium to produce a substantially uniform background on the magnetic medium.

The system is disposed in a casing. First and second adjustable means respectively extend through the casing to adjust the disposition of the polarizer and the analyzer relative to the thin magnetic film. First and second resilient means are respectively disposed between the magnetic medium and the thin magnetic film and between the biasing means and the casing.

This invention relates to a magneto-optical reproducer. More specifically, this invention relates to a magneto-optical reproducer which may be characterized as a hand viewer. The magneto-optical reproducer of the present invention is light-weight and may be held in one hand as it is being used by an operator. The magneto-optical hand viewer of the present invention may be used to produce a visual representation of the magnetic states in a magnetic medium such as a magnetic tape.

In record-reproduce systems using a magnetic medium it is often desirable to check the condition of a signal as recorded on the magnetic medium such as a magnetic tape. A particularly simple way in which to check the condition of the recording on the magnetic medium is to produce a visual representation of the magnetic states in the magnetic medium. For example, a visual representation of the magnetic states in a magnetic medium has been accomplished in the prior art by using a device which incorporates a plurality of fine magnetic particles suspended in a liquid. The device is placed on a magnetic medium such as a magnetic tape which has been recorded in the desired manner. Theoretically, the magnetic particles which are suspended in the liquid would arrange themselves in accordance with the magnetic states in the magnetic medium such as the magnetic tape. The arrangement of the magnetic particles in the liquid would be a visual representation of the magnetic states in the magnetic medium such as the magnetic tape.

In using the prior art device as described above, certain difficulties are found. For example, the magnetic particles suspended in the liquid do not readily align themselves in accordance with the magnetic states in the magnetic medium and the magnetic particles must be agitated so that they will arrange themselves in a proper visual pattern. The agitation of the magnetic particles is usually accomplished by the operator of the prior art device by tapping the device so as to produce an agitation of the liquid with a corresponding agitation of the magnetic particles.

The prior art device, as explained above, is somewhat imperfect in that the visual pattern of magnetic particles is subject to rather gross inaccuracies. For example, the accuracy of the prior art device is subject to the facility of the particular operator as the operator agitates the magnetic particles. In addition, the prior art device produces visual representations limited in resolution since the resolution is dependent on the number of magnetic particles. Also, the prior art device cannot provide a continuous reading of the magnetic states over a length of the magnetic medium such as magnetic tape. The prior art device must be positioned each time in order to provide visual representation.

Although the prior art device, as explained above, is not particularly accurate, still the provision of a visual representation of the magnetic states in a magnetic medium has many advantages. For example, the visual representation may be used to directly check the quality of the magnetic medium, such as a magnetic tape. This may be accomplished by recording a constant signal or a constant alternating signal on the magnetic medium. A visual check of the magnetic states in the magnetic medium readily indicates whether any defects are present in the structure of the magnetic medium itself.

Another manner in which a visual representation of the magnetic states in a magnetic medium may be used is to produce a check of the recording system. The quality of the recorded signal as shown by the visual representation may be easily determined by the operator of the device so as to provide a check on the recording system. The visual representation may also be used to readily indicate the physical placement of an individual or a plurality of tracks of information which are recorded on the magnetic medium. Also, the visual representation may be used to provide alignments in the recording system so as to reduce skew or other undesiable effects.

The visual representation of the magnetic states in a magnetic medium may also be used to produce a gross check of defects in a recording and reproducing system. For example, if there is a defect in an output signal as reproduced from a magnetic medium, the visual representation of the magnetic states in the magnetic medium may be used to determine if the defect is in the reproducing or in the recording portion of the system. If in checking the visual representation it is determined that the recorded signal has been properly recorded on the magnetic medium, it is obvious that the defect in the system must be in the reproducing portion. Conversely, if it is observed that the signal has not been recorded properly on the magnetic medium, it is then obvious that the defect must be in the recording portion of the system.

The use of a device to provide a visual representation of the magnetic states in a magnetic medium may also be a valuable analytical tool in the laboratory. The visual representation may be used to check magnetic materials for use in producing coatings in magnetic mediums such as tapes. The visual representation may also be used to check magnetic materials for use in magneto-optical systems and to check various components used in magneto-optical systems.

The hand viewer of the present invention is directed specifically to an apparatus constructed to operate using magneto-optical principles for providing the visual representation of the magnetic states in a magnetic medium such as a magnetic tape. The present invention provides the visual representation using the Kerr and Faraday magneto-optical effects. The Kerr magneto-optical effect produces a rotation of the major direction of polarization of the rays of a light beam reflected from a magnetic surface. The Faraday magneto-optical effect produces a rotation of the major direction of polarization of the rays of a light beam passing through a magnetic medium. The magneto-optical hand viewer of the present invention uses a combination of the Kerr and Faraday magneto-optical effects to provide a maximum amplitude of rotation of the rays of the light beam.

The magneto-optical hand viewer of the present invention includes a light source for directing light energy toward a collimating lens. The collimating lens modifies the light energy so that the light energy passing from the collimating lens generally may be considered to be a light beam having parallel rays of light. The light beam having parallel rays of light is then passed through a polarizer to produce a collimated linearly polarized beam of light and the beam of light is directed to an optical prism.

The optical prism has first and second surfaces for passing the light energy and a third surface which has been coated with a very thin film of magnetic material. The magnetic medium is placed next to the thin film and the magnetic states in the magnetic medium induces corresponding states in the thin film. The collimated linearly polarized beam of light is directed through the first surface of the optical prism and toward the thin film and a portion of the light is reflected from the thin film and through the second surface of the optical prism. The portion of the light that is reflected from the thin film also has rotations in accordance with the magnetic states in the thin film as defined by the Kerr magneto-optical effect.

The optical prism provides a total internal reflection so that the light energy which is not reflected from the thin film passes into the thin film and back out in accordance with the total internal reflection and is directed through the second surface of the optical prism. A major portion of the light energy will pass into the thin film since the thin film is sufficiently thin so as to provide a relatively high amount of transmissivity in the thin film. The light energy which passes into and out of the thin film has rotations in accordance with the magnetic states in the thin film as defined by the Faraday magneto-optical effect.

The light energy which passes out of the optical prism, therefore, has been rotated in accordance with both the Kerr and the Faraday magneto-optical effects. The rotated light energy then passes through an analyzer. The analyzer is basically a second polarizer which is set at an acute angle near to but not equal to 90° from the plane of polarization of the incident light beam. Light energy from the analyzer, therefore, has variations in intensity in accordance with the rotations produced by the combined magneto-optical effects. The light energy from the analyzer now passes to an eyepiece which contains a focusing lens so as to produce a visual representation of the magnetic states in the magnetic medium to a viewer looking into the eyepiece.

The magneto-optical hand viewer of the present invention also contemplates biasing the thin film with a repetitive signal to improve the visual representation of the magnetic states in the magnetic medium by producing a uniform background in the areas where there is no recorded signal on the magnetic medium. The magneto-optical hand viewer of the present invention biases the thin film with pulses or short bursts of energy so as to reduce the power consumption of the hand viewer. The reduction of the power consumption becomes relatively important in trying to maintain a low weight for the hand viewer.

The biasing signal may be a uni-polar signal in either the positive or negative direction so as to produce either a light or dark background in the visual representation. The light or dark background is determined in accordance with the direction of the uni-polar signal in relation to the magnetization in the thin film. The biasing signal may also be dual-polar at a rate sufficiently high so that the viewer optically integrates, with his eye, the resultant visual representation to appear as a uniform gray background.

The entire invention will be made clearer with reference to the following description and drawings, wherein.

Figure 1:
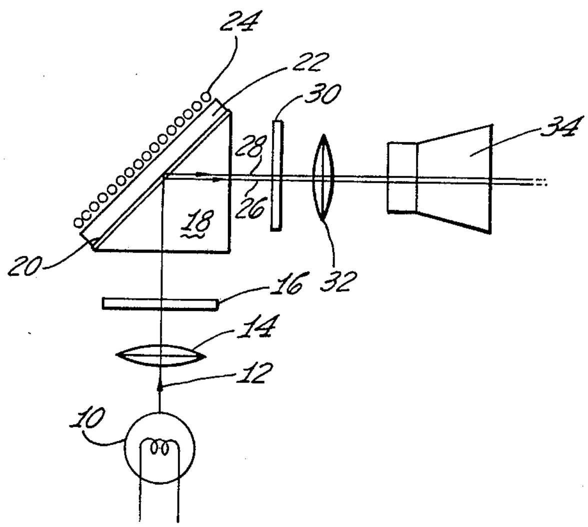
FIG. 1 is a schematic representation of the magneto-optical hand viewer of the present invention.

In FIG. 1 a light source 10 produces light energy. The light source 10 may be, for example, any conventional type of incandescent lamp. The light energy generated by the light source 10 is represented by a single line 12 but it is to be appreciated that the light energy produced by the light source 10 would be scattered in many directions. The light energy from the light source 10 passes through a collimating lens 14. The scattered light energy is converted into a plurality of parallel rays of light energy by the collimating lens 14. The rays of light energy from the collimating lens 14 then passes through a polarizer 16 which produces a linearly polarized beam of light energy.

The collimated linearly polarized beam of light energy is now directed to an optical prism 18. The prism 18 includes a thin film 20 of magnetic material deposited on one surface. The thin film 20 preferably is composed of a magnetic material that has essentially a square hysteresis loop so as to be either magnetized in one of two states of magnetization. It has been determined that the thickness of the thin film 20 is somewhat critical depending upon the particular magnetic material used, but that generally the thin film should have a thickness of around 200 angstroms. Since the thin film 20 is relatively transparent when it has a thickness of only 200 angstroms, the prism 18 is designed to provide a total internal reflection for any light energy striking the internal surface of the thin film 20.

In the operation of the apparatus of FIG. 1, a magnetic medium 22 is positioned adjacent the thin film 20. The magnetic medium 22 has been recorded in a desired manner and may be a magnetic chip, a magnetic tape, or any other form of magnetic medium. The coercivity of the magnetic medium 22 is generally higher than the coercivity of the thin film 20. In this manner, the magnetic states in the magnetic medium 22 induce corresponding magnetic states in the thin film 20. At the particular points where the magnetic medium 22 contains recorded information, the magnetic medium induces corresponding magnetic states in the thin film 20. However, in the areas where there has been no recording on the magnetic medium 22, the thin film 20 may take any one of its two possible magnetic states. For example, the thin film 20 may contain information corresponding to an earlier observed magnetic medium.

Since it is undesirable to have such false information in the background areas of the thin film 20, it is desirable to erase the false information. Although it would be possible to provide an erasing means to magnetize the thin film 20 in one of its two magnetic states before observing each magnetic medium, this still would not eliminate the problem since during the observation of the magnetic medium it is possible for some of the background areas of the thin film 20 to change due to other magnetic forces. Also, it would not be desirable to provide such an erasure since the thin film 20 could not be used to provide a continuous observation over a strip of magnetic tape which is moved relative to the thin film. Accordingly, a biasing coil 24 is disposed adjacent the magnetic medium 22 to provide a uniform background area.

The output from the biasing coil 24 is not strong enough to produce any appreciable effect on the magnetic states in the magnetic medium 22. Also, the output from the biasing coil 24 is not strong enough to provide any effect on those points on the thin film 20 which have magnetic states corresponding to the magnetic states in the magnetic medium 22. The strength of the field from the biasing coil 24 is only sufficient to affect those areas on the thin film 20 which are characterized as the background areas; that is, those areas where no information corresponding to the information in the magnetic medium is present.

The biasing coil 24 may produce a dual-polar or a unipolar signal so as to provide either a white, gray or black background. Since the magneto-optical hand viewer of the present invention is to be carried about from one location to another, it is desirable to eliminate as much weight and bulk as possible. It is, therefore, desirable to use a pulse signal for the input signal to the biasing coil so as to reduce the power consumption of the system and, therefore, reduce the size of the required components.

The light energy characterized by the line 12 now strikes the thin film 20 and a portion of the light energy is directly reflected from the back surface of the thin film 20 as shown by the light energy 26. This light energy 26 is rotated in accordance with the magnetic states in the thin film 20 as defined by the Kerr magneto-optical effect. The remaining portion of the light energy 12 passes into the thin film 20 and, due to the total internal reflection of the prism 18, comes back into the prism as shown as the light energy 28. Although the portions of light energy 26 and 28 are shown appreciably separated from each other, it is to be appreciated that in the actual system the distance between the portions of light energy 26 and 28 is very small. The light energy 28 which passes through the thin film 20 is rotated in accordance with the magnetic states in the thin film as defined by the Faraday magneto-optical effect. The combination of the portions of light energy 26 and 28 are then passed through an analyzer 30.

The analyzer 30 is basically another polarizer which is set at an acute angle near to but not equal to 90° from the plane of polarization of the incident light beam as represented by the line 12. The output light signal from the analyzer 30, therefore, has intensities in accordance with the magnetic states in the thin film 20 which in turn correspond to the magnetic states in the magnetic medium 22. It is possible to adjust the relationship between the polarizer 16 and the analyzer 30 so that either light or dark indicates the presence of a particular magnetic state in the magnetic medium 22.

The light energy from the analyzer 30 then passes through a focusing lens 32 which is adjusted to provide the visual representation to a viewer looking through an eyepiece 34. The viewer, therefore, sees the visual representation of the magnetic states in the magnetic medium 22 with an apparatus operating on Kerr and Faraday magneto-optical principles. The thin film 20 is used as a transfer medium for the magnetic medium 22 and the thin film 20 may be accurately maintained as to optical properties. The biasing coil 24 provides for the uniform background so as to increase the clarity of the visual representation. It is to be appreciated that the light energy directed to the thin film 20 covers an appreciable area and that the visual representation is accordingly representative of the magnetic states in the magnetic medium over the corresponding area.

Figure 2:
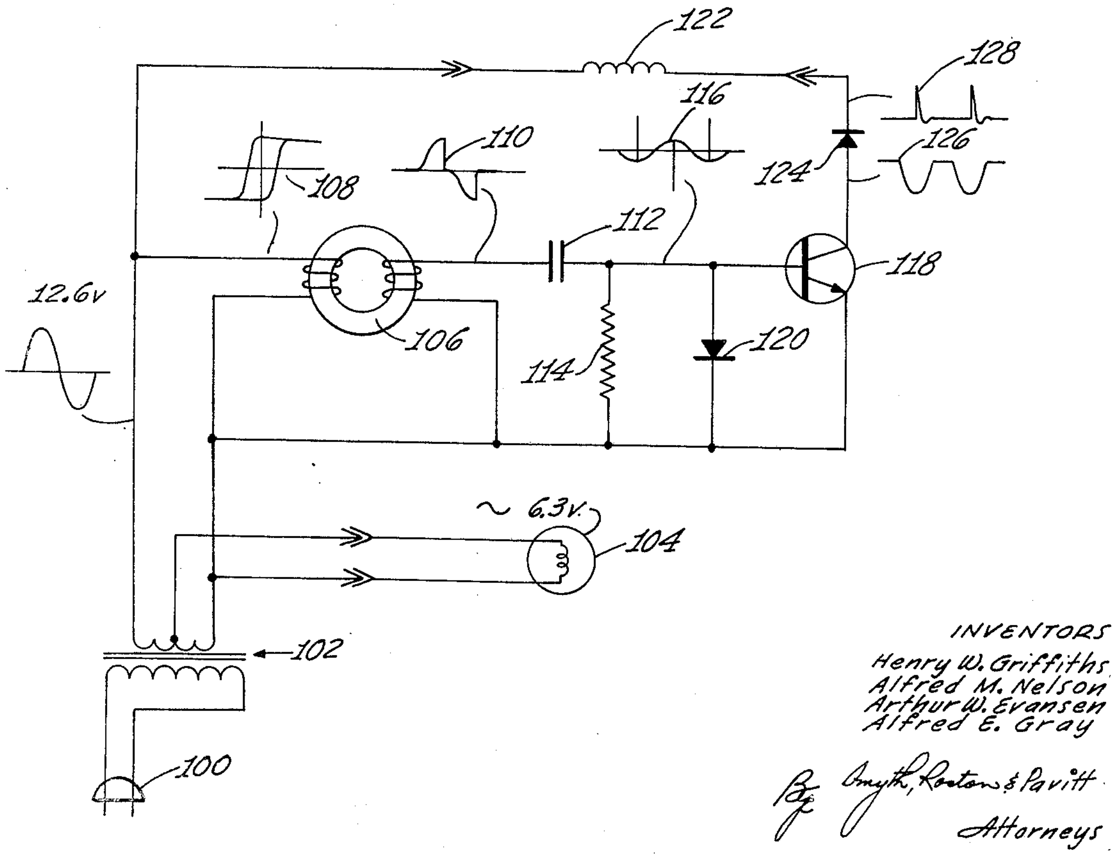
FIG. 2 is an electrical schematic showing a circuit configuration used to power the light source and the biasing means in the hand viewer of the present invention.

FIG. 2 illustrates a particular electrical circuit which may be used with the system of FIG. 1. In FIG. 2, the line current from a plug 100 is applied to a stepdown transformer 102. The stepdown transformer provides a sine wave having an amplitude of approximately 12.6 volts across the outside terminals of the secondary winding and a sine wave having an amplitude of approximately 6.3 volts across the center tap and the outside terminal of the secondary winding. The 6.3 volt sine wave is applied to a source of light 104 which may be, for example, the source of light 10 shown in FIG. 1. The 12.6 volt sine wave is applied to the input winding of a second transformer 106 which operates as a switching transformer. The core material of the transformer 106 has a square hysteresis loop as shown by diagram 108. As can be seen by diagram 108, the transformer 106 modifies the input signal to produce an output signal 110 from the transformer 106.

The output signal 110 from the secondary winding of the transformer 106 is then applied to a differentiator including a capacitor 112 and a resistor 114. The signal 110 is modified by the differentiator to produce a signal 116. The signal 116 is applied to the base of a transistor 118. Half of the signal 116 is bypassed through the use of a diode 120.

The output signal from the transformer 102 is also applied through a bias coil 122 and a rectifier 124 to the collector of the transistor 118 and the voltage on the collector of the transistor 118 is therefore as shown by signal 126. The transistor 118 is therefore controlled to operate so as to pass an output current signal 128 to the coil 122. The biasing coil 122 therefore biases the thin film 20, as shown in FIG. 1, with a pulse signal.

Although the biasing signal is shown as a pulse signal 128 of a particular polarity, it is to be appreciated that the opposite polarity for the biasing signal may be used. The particular polarity for the biasing signal is chosen so as to control the background area to be either light or dark. In addition, it is to be appreciated that a dual-polar alternating pulse signal may be applied to the bias coil 122. The repetition rate of the alternating pulse signal must be sufficiently high so that the viewer in seeing the visual representation of the signal will optically integrate such a signal so as to produce a uniform gray background area.

Figure 3:
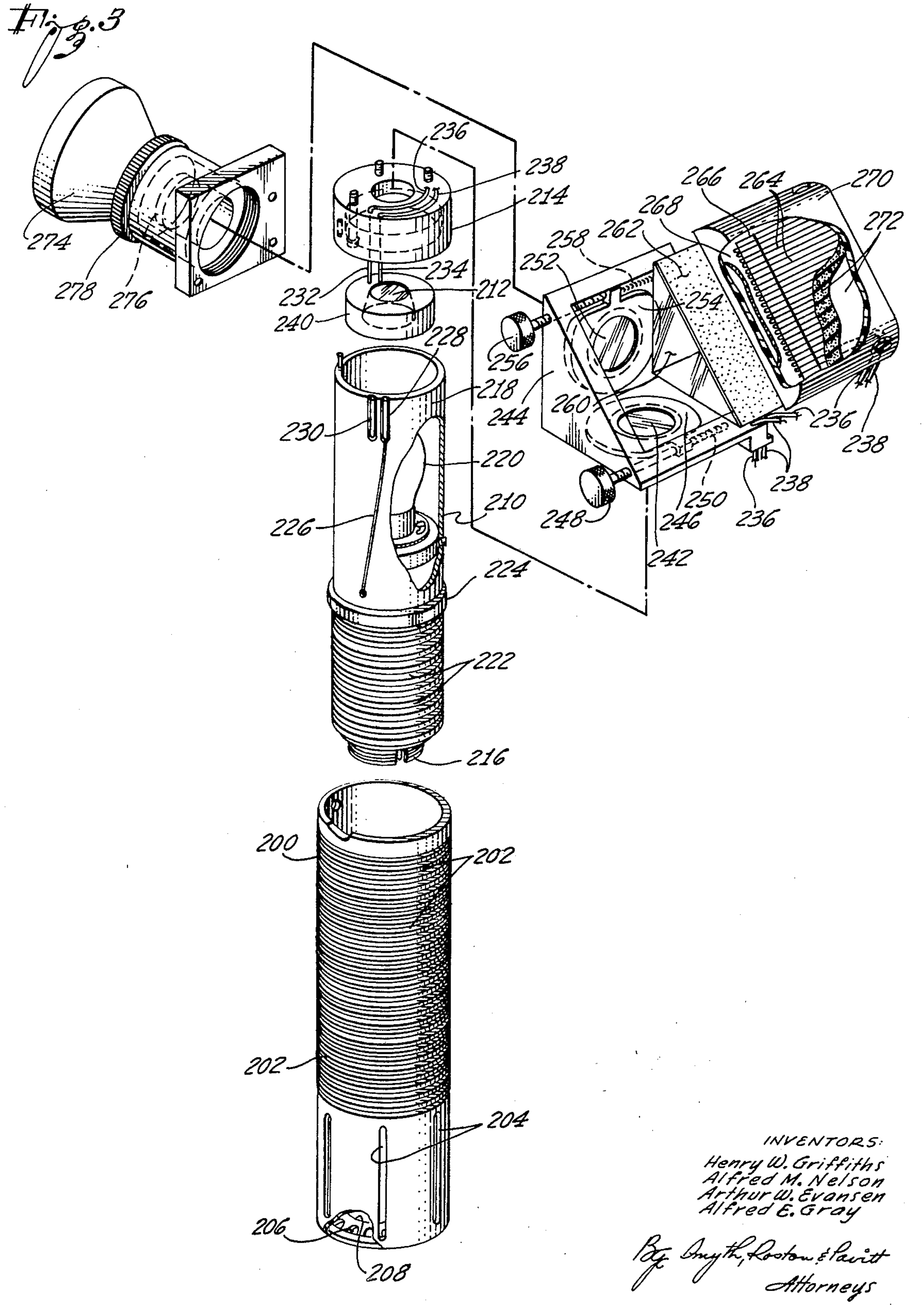
FIG. 3 is a detail exploded view of a particular embodiment of the magneto-optical hand viewer of the present invention.

In FIG. 3 a detail exploded view is shown of a particular embodiment of the hand viewer which is constructed in accordance with the present invention. The hand viewer of FIG. 3 includes an outer case 200. The outer case 200 is a right circular cylinder and is made of an insulating material such as phenolic. The outer case 200 includes a plurality of grooves 202 which circumferentially extend around the upper portion of the case 200 so as to provide for the dissipation of heat energy and for a better gripping of the outer case. In addition, a plurality of slots 204 and holes 206 extend into the interior of the case 200 so as to provide a means for ventilation of the interior of the case 200. A large hole 208 extends through the bottom of the case 200 so as to permit an electrical plug to extend therethrough.

The outer case 200 encloses an inner housing 210, a lens 212 and a spacer ring 214. The inner housing 210 includes an electrical plug 216 which extends through the opening 208 of the outer case 200 so as to provide electrical power to the hand viewer. The upper portion of the inner housing 210 is a cylinder 218 shown partially broken away to illustrate that the upper portion 218 encloses a light source 220. The light source 220 is supplied with electrical energy through the electrical plug 216.

The upper portion 218 of the inner housing 210 is constructed of metal which is heat conductive so as to absorb the heat produced by the light source 220. Some of the heat radiates outwardly to the case 200 and is then radiated from the grooves 202 in the surface of the case 200. Some of the heat is conducted down to the lower portion of the inner housing 210 to be dissipated by the fins 222. The fins 222 provide a large surface area by which the heat energy is radiated. The slots 204 and the holes 206 in the outer casing 200 provide ventilation to the fins 222.

An insulating ring 224 extends around the inner casing 210 so as to electrically insulate the inner housing 210 from the outer casing 200. It is to be noted that the insulating ring 224 contacts the inside surface of the casing 200 only at selected points. The insulating ring 224 is spaced away from the inner surface of the casing 200 at the other points so as to allow heat to readily pass from the upper portion and out of the lower portion of the inner housing 210.

Electrical energy is carried from the plug 216 and along the upper portion 218 of the inner housing 210 through an insulated wire 226. The insulated wire 226 terminates in a plug 228 insulated from the inner housing 210. A second plug 230 provides a ground connection. The spacer ring 214 includes a pair of pins 232 and 234 which mate with the plugs 228 and 230 and the pins serve to carry the electrical energy to the wires 236 and 238. The insulating ring 214 sits at the upper portion 218 of the inner housing 210 and serves as a spacer in combination with the spacer 224 to space the inner housing 210 a fixed distance away from the inner surface of the outer case 200. The spacer ring 214 also serves to enclose the collimating lens 212. The collimating lens 212 is maintained in a fixed position by a member 240 which sits within the spacer ring 214.

The light energy from the light source 220 passes through the collimating lens 212 and is directed toward a polarizer 242. The polarizer is mounted for adjustment in an upper housing 244. The adjustment of the polarizer is provided by mounting the polarizer in an outer ring 246 and by providing a screw means 248 acting against a spring 250 to produce a rotation of the outer ring 246. A second polarizer 252 which serves as the analyzer in the hand viewer of the present invention is located on an opposite face of the housing 244. As can be seen, the second polarizer 252 is also enclosed in an outer ring 254 and a screw 256 and spring arrangement 258 are used to provide an adjustment. In this manner, the proper adjustment of the relationship between the polarizers 242 and 252 may be produced by adjusting the screws 248 and 256.

The light from the collimating lens 212 passes through the polarizer 242 and is directed to a prism 260 constructed to provide total internal reflection. The prism 260 is coated with a thin film of magnetic material 262. The light from the polarizer 242 passes to the internal surface of the thin film 262 and portions of the light are rotated in accordance with the Kerr magneto-optical effect and portions of the light are rotated in accordance with the Faraday magneto-optical effect. The particular magnetic states in the thin film 262 which produce the rotations of the light are in accordance with the magnetic states in a magnetic medium (not shown). The magnetic medium would be disposed adjacent to the thin film 262 as explained with reference to FIG. 1.

A bias coil 264 is wrapped around an insulating member 266 and is positioned adjacent to the thin film 262 with an intervening layer of felt 268. The magnetic medium (not shown) is located between the felt 268 and the thin film 262. The wires 236 and 238 extend up to the bias coil 264 so as to provide the proper energization of the bias coil 264. The bias coil may be energized as explained with reference to FIGS. 1 and 2. The bias coil 264 fits within a cap 270. A polyfoam cushion 272 is positioned within the cap 270 behind the bias coil 264 so as to maintain the bias coil in a resilient manner. The resiliency of the bias coil 264 maintains a good contact between the magnetic medium (not shown) and the thin film 262. The cap 270 is designed to allow a continuous strip of a magnetic medium such as a magnetic tape to be drawn through the cap and moved adjacent to the thin film.

The light energy passes from the thin film 262 to the analyzer 252 which produces light energy having variations in intensity as explained with reference to FIG. 1. The light energy from the analyzer 252 is directed to an eyepiece 274. Included in the eyepiece 274 is a focusing lens 276 which may be adjusted using the stop ring 278 so as to propide a proper focusing of the visual representation as the operator looks into the eyepiece 274.

It is to be appreciated that the invention has been described with reference to a particular embodiment. It should be noted, for example, that the hand viewer may take other forms than that shown in FIG. 1 but that the same general principles of the invention would be incorporated. It is also to be appreciated that, as explained above, the biasing so as to provide a uniform background for the visual representation of the magnetic states in a magnetic medium, may be accomplished using an alternating signal, for example, a signal which has alternating pulses, at a rate sufficiently high so that the viewer optically integrates the signal so that the background appears as a uniform gray. The invention, therefore, is capable of various modifications and adaptations and is only to be limited by the appended claims.

What is claimed is:

1. A magneto-optical hand viewer for producing a visual representation of the magnetic states in a magnetic medium, including:
   - a casing constructed to be held in the hand of a person viewing the magnetic states of the magnetic medium,
   - first means disposed within the casing for producing a linearly polarized beam of light rays,
   - an optical prism disposed within the casing and operatively coupled to the first means for receiving the beam of light rays and for producing a reflection of the beam of light rays from a first surface of the optical prism,
   - means for disposing the first surface of the optical prism adjacent the magnetic medium,
   - a thin film of magnetic material disposed on the first surface of the optical prism adjacent to the magnetic medium for having magnetic states corresponding to the magnetic states in the magnetic medium induced into the thin film and for producing rotations of the light rays in the beam in accordance with the magnetic states in the thin film,
   - second means disposed within the casing and disposed relative to the optical prism for receiving the rotated beam of light rays passing from the prism to produce variations in intensity of the beam of light rays in accordance with the rotations,
   - third means disposed within the casing and disposed relative to the second means for obtaining a visual view of the beam of light rays having the variations in intensity, and
   - biasing means disposed within the casing in adjacent and substantially parallel relationship to the thin film to apply to the thin film a magnetic field having a strength less than that provided on the magnetic medium for the representation of information to obtain the production on the thin film of a substantially uniform background.

2. The magneto-optical hand viewer set forth in claim 1 wherein first adjustable means extend through the casing from a position external to the casing and are operatively coupled to the first means and are adjustable to provide an adjustment in the polarizing of the light by the first means and wherein second adjustable means extend through the casing from a position external to the casing and are operatively coupled to the second means and are adjustable to provide an adjustment in the intensity of the light beams from the second means.

3. The magneto-optical hand viewer set forth in claim 1 wherein resilient means are disposed between the thin film and the magnetic medium.

4. The magneto-optical hand viewer of claim 1 wherein the biasing means produces pulses of energy at a repetitive rate.

5. The magneto-optical hand viewer of claim 1 wherein the biasing means produces a uni-polar pulse train.

6. The magneto-optical hand viewer of claim 1 wherein the biasing means produces a pulse train having dual polarities with the pulses of one polarity alternating with the pulses of the other polarity.

7. The magneto-optical hand viewer set forth in claim 2 wherein resilient means are positioned between the biasing means and the casing.

8. The magneto-optical hand viewer of claim 1 wherein the first means includes a source of light energy which radiates unwanted heat energy and the first means additionally includes means for dissipating the heat energy.

9. In combination for producing a visual representation of the magnetic states in a magnetic medium:

first means for producing a linearly polarized beam of light rays, an optical prism disposed relative to the first means for receiving the polarized beam of light rays and for producing a reflection of the beam of light rays from a first surface of the optical prism, a thin film of magnetic material disposed on the first surface of the optical prism and located adjacent to the magnetic medium for having magnetic states induced into the thin film at different positions in accordance with the magnetic states in the magnetic medium and for producing rotations of the light rays in the beam in accordance with the magnetic states in the thin film, biasing means magnetically coupled to the thin film and disposed in substantially the same plane as the thin film for biasing all areas of the thin film with a magnetic intensity less than that produced on the thin film by the magnetic medium at the positions representing information on the magnetic medium to obtain the production of a substantially uniform magnetic background at all positions on the thin film except the positions representing the information, means disposed relative to the prism for analyzing the light passing from the prism to produce variations in the intensity of the light rays in the beam in accordance with the rotations of the light rays, and means disposed relative to the last mentioned means for providing a visual presentation of the variations in the intensity of the light rays from the last mentioned means.

10. The combination set forth in claim 9 wherein the biasing means bias all areas of the thin film with pulses of energy.

11. The magneto-optical hand viewer of claim 10 wherein the biasing means produce the pulses of energy in a uni-polar pulse train.

12. The magneto-optical hand viewer of claim 10 wherein the biasing means produce the pulses of energy in a pulse train having dual polarities with the pulses of one polarity alternating with the pulses of the other polarity.

13. A magneto-optical hand viewer for producing a visual representation of the magnetic states in a magnetic medium, including:

a casing constructed to be held in the hand of a person viewing the magnetic states of the magnetic medium, a thin magnetic film disposed within the casing relative to the magnetic medium for having magnetic states induced in the thin film in accordance with the magnetic states in the magnetic medium and for providing a rotation of light at different positions in accordance with the magnetic states induced in the thin film at such positions, a source of polarized light energy disposed within the casing for providing the polarized light energy to obtain rotations in the light energy by the thin film in accordance with the magnetic states in the thin film, optical means disposed within the casing and having a surface supporting the thin film and disposed relative to the polarized light source for directing the polarized light from the source to such surface and for directing from the optical means the light rotated by the thin film in accordance with the magnetic states in the thin film, first means disposed within the casing for receiving the rotated light energy from the optical means and for producing variations in intensity in such light energy in accordance with the rotations, second means disposed within the casing relative to the first means for providing a visual representation of the light energy having the variations in intensity, and third means disposed within the casing in substantially the same plane as the thin film and in contiguous relationship to the thin film for biasing the thin film with variable energy of a maximum intensity less than that produced on the thin film by the magnetic states representing information on the magnetic medium to obtain the production on the thin film of a substantially uniform background for the light energy having the variations in intensity as viewed by the second means.

14. The mangeto-optical hand viewer of claim 13 wherein the source of light energy radiates unwanted heat energy and means are additionally included for dissipating the heat energy.

15. The magneto-optical hand viewer of claim 13 wherein the biasing means produce the variable energy in a unipolar signal train.

16. The magneto-optical hand viewer of claim 13 wherein the biasing means produce the variable energy in a signal train with dual polarities and with the signals of one polarity alternating with the signals of the other polarity.

17. The magneto-optical hand viewer of claim 13 wherein the source of polarized light energy includes a polarizer and wherein the first means include an analyzer and wherein first adjustable means extend through the casing and are operatively coupled to the polarizer and are adjustable to provide adjustments in the disposition of the polarizer relative to the thin film and wherein second adjustable means extend through the casing and are operatively coupled to the analyzer and are adjustable to provide adjustments in the disposition of the analyzer relative to the thin film.

18. The magneto-optical viewer set forth in claim 17 wherein first resilient means are disposed between the magnetic medium and the thin film.

19. The magneto-optical viewer set forth in claim 18 wherein second resilient means are also disposed between the biasing means and the casing.

20. The magneto-optical hand viewer set forth in claim 13 wherein the optical means constitute a prism having a pair of surfaces transverse to each other and to the first surface and wherein the polarized light passes to the first surface from one of the surfaces in the pair and where the rotated light from the first surface passes through the other surface in the pair to the first means.

References Cited

UNITED STATES PATENTS

| | | | |
|---|---|---|---|
| 3,142,720 | 7/1964 | Adams | 350—151 |
| 3,158,673 | 11/1964 | Sites | 350—151 |
| 3,200,701 | 8/1965 | White | 88—14 |
| 3,268,879 | 8/1966 | Lins | 350—151 |
| 3,284,785 | 11/1966 | Kornei | 350—151 |

FOREIGN PATENTS

| | | |
|---|---|---|
| 1,080,432 | 7/1954 | France. |

OTHER REFERENCES

Supernowicz: "Magneto-Optical Readout From a Magnetized Nonspecular Oxide Surface," Journal of Applied Physics, vol. 34, No. 4 (Part 2), (April 1963) pp. 1110–1111.

DAVID SCHONBERG, Primary Examiner

P. R. MILLER, Assistant Examiner

U.S. Cl. X.R.

340—174.1; 350—152; 356—118